US008909928B2

(12) United States Patent
Ahmad et al.

(10) Patent No.: US 8,909,928 B2
(45) Date of Patent: Dec. 9, 2014

(54) SECURING CUSTOMER VIRTUAL MACHINES IN A MULTI-TENANT CLOUD

(75) Inventors: Irfan Ahmad, Mountain View, CA (US); Mukund Gunti, Mountain View, CA (US); Abhishek Chaturvedi, Mountain View, CA (US); Vladimir Kiriansky, Los Altos, CA (US)

(73) Assignee: VMware, Inc., Palo Alto, CA (US)

( * ) Notice: Subject to any disclaimer, the term of this patent is extended or adjusted under 35 U.S.C. 154(b) by 566 days.

(21) Appl. No.: 13/045,212

(22) Filed: Mar. 10, 2011

(65) Prior Publication Data

US 2011/0302415 A1 Dec. 8, 2011

Related U.S. Application Data

(60) Provisional application No. 61/350,809, filed on Jun. 2, 2010.

(51) Int. Cl.
| | |
|---|---|
| H04L 9/32 | (2006.01) |
| G06F 21/57 | (2013.01) |
| H04L 29/06 | (2006.01) |
| H04L 9/08 | (2006.01) |

(52) U.S. Cl.
CPC ............ *G06F 21/57* (2013.01); *H04L 63/0428* (2013.01); *H04L 63/08* (2013.01); *H04L 9/08* (2013.01); *H04L 9/0825* (2013.01); *H04L 9/083* (2013.01); *H04L 9/0897* (2013.01)
USPC .......................................................... 713/168

(58) Field of Classification Search
USPC .......................................................... 713/168
See application file for complete search history.

(56) References Cited

U.S. PATENT DOCUMENTS

| | | | | |
|---|---|---|---|---|
| 7,058,807 | B2 * | 6/2006 | Grawrock et al. ............ | 713/172 |
| 7,392,403 | B1 * | 6/2008 | Munetoh ....................... | 713/193 |
| 7,836,299 | B2 * | 11/2010 | England et al. ............... | 713/162 |
| 7,840,801 | B2 * | 11/2010 | Berger et al. ................. | 713/164 |

(Continued)

FOREIGN PATENT DOCUMENTS

| | | |
|---|---|---|
| EP | 1271282 A2 | 1/2003 |
| WO | 00/48063 A1 | 8/2000 |

OTHER PUBLICATIONS

Notification of Transmittal of the International Search Report and the Written Opinion of the International Searching Authority, or the Declaration, European Patent Office mailed May 18, 2011.

(Continued)

*Primary Examiner* — Carolyn B Kosowski (57) ABSTRACT

A trusted virtualization platform protects sensitive customer data during operation of virtual machines in a multi-tenant cloud computing center. The trusted virtualization platform limits administrator access to the data and state of the virtual machines running thereon, reports any changes made thereto, and requires keys provided by the customer or a trusted third party of the customer to perform management operations on the virtual machines. By requiring cloud computing centers to use such trusted virtualization platforms, customers uploading their virtual machines into the cloud computing center can be assured that cloud administrators will not be able to access or tamper with their private data. Furthermore, customers can directly audit all important state or configuration changes for their virtual machines as the trusted virtualization platform can be configured to report all such changes according to a security policy set by the customer.

23 Claims, 5 Drawing Sheets

(56) References Cited

U.S. PATENT DOCUMENTS

| | | | |
|---|---|---|---|
| 7,987,289 B2* | 7/2011 | Mason et al. | 709/242 |
| 8,132,003 B2* | 3/2012 | Durham et al. | 713/164 |
| 8,161,285 B2* | 4/2012 | Ellison et al. | 713/176 |
| 8,364,983 B2* | 1/2013 | Rangegowda et al. | 713/193 |
| 8,412,945 B2* | 4/2013 | Sweet et al. | 713/176 |
| 8,505,103 B2* | 8/2013 | Song et al. | 726/25 |
| 8,538,919 B1* | 9/2013 | Nielsen et al. | 707/610 |
| 8,539,551 B2* | 9/2013 | Masuoka et al. | 726/3 |
| 8,799,997 B2* | 8/2014 | Spiers et al. | 726/3 |
| 2004/0193873 A1 | 9/2004 | England | |
| 2005/0251867 A1 | 11/2005 | Sastry et al. | |
| 2005/0283602 A1* | 12/2005 | Vembu et al. | 713/150 |
| 2008/0083039 A1* | 4/2008 | Choi et al. | 726/27 |
| 2008/0178176 A1* | 7/2008 | Berger et al. | 718/1 |
| 2008/0244569 A1 | 10/2008 | Challener et al. | |
| 2009/0178138 A1* | 7/2009 | Weiss et al. | 726/22 |
| 2009/0276774 A1* | 11/2009 | Kinoshita | 718/1 |
| 2009/0282266 A1* | 11/2009 | Fries et al. | 713/193 |
| 2009/0293058 A1* | 11/2009 | Ahn et al. | 718/1 |
| 2010/0017512 A1* | 1/2010 | Ciano et al. | 709/225 |
| 2010/0107160 A1 | 4/2010 | Srinivasan | |
| 2010/0132016 A1* | 5/2010 | Ferris | 726/4 |
| 2011/0022812 A1* | 1/2011 | van der Linden et al. | 711/163 |
| 2011/0060947 A1* | 3/2011 | Song et al. | 714/37 |
| 2011/0061050 A1* | 3/2011 | Sahita et al. | 718/1 |
| 2011/0126197 A1* | 5/2011 | Larsen et al. | 718/1 |
| 2011/0179477 A1* | 7/2011 | Starnes et al. | 726/9 |
| 2012/0042163 A1* | 2/2012 | Goodman et al. | 713/168 |
| 2012/0110328 A1* | 5/2012 | Pate et al. | 713/165 |
| 2012/0159634 A1* | 6/2012 | Haikney et al. | 726/25 |
| 2012/0304233 A1* | 11/2012 | Roberts et al. | 725/82 |

OTHER PUBLICATIONS

Nuno Santos et al., "Towards Trusted Cloud Computing," Workshop on Hot Topics in Cloud Computing—USENIX 2009, Jun. 15, 2009.

TCG Specification—Architecture Overview, Revision 1.4, Aug. 2, 2007.

David Grawrock, Dynamics of a Trusted Platform: A Building Block Approach, Intel Press, 2009, pp. 197-226.

Kenneth Goldman et al., "Linking Remote Attestation to Secure Tunnel Endpoints," IBM Research Report, Jun. 21, 2006.

Jonathan Poritz, "Hash Chains: A Weak Link for Trusted Computing," Submitted to Eurocrypt '06, Aug. 22, 2005.

Australian Patent Examination Report No. 1 for counterpart AU Patent Application No. 2011261831, dated Jul. 31, 2013, 3 pages.

\* cited by examiner

SECURING CUSTOMER VIRTUAL MACHINES IN A MULTI-TENANT CLOUD

CROSS-REFERENCE TO RELATED APPLICATION(S)

This application claims the benefit of U.S. Provisional Patent Application No. 61/350,809, filed Jun. 2, 2010 and entitled "Securing Customer Virtual Machines in a Multi-Tenant Cloud," the entire contents of which are incorporated by reference herein.

BACKGROUND

Motivated by economies of scale from hosting workloads from thousands of customers and the resulting benefits from overcommitment and statistical multiplexing of load, service providers are setting up large virtualized cloud computing centers. However, many enterprise customers are unwilling to send their critical workloads into the cloud due to security concerns.

In current configuration of cloud computing centers, customers do not have control over where their workload is executed. As a result, when a customer's virtual machine is powered-up on a host within the cloud computing center, information in the virtual machine could be compromised in several ways. For example, the host could keep a snapshot of the virtual machine, do memory inspection, and gain knowledge of the customer's potentially sensitive data. In addition, the cloud administrator has virtually limitless access over the data and state of all virtual machines running for all customers. This includes reading virtual disks directly, and sniffing private virtual network traffic of a customer between two of his or her virtual machines.

SUMMARY

One or more embodiments of the present invention provide a trusted virtualization platform as a way of securing customer virtual machines in a multi-tenant cloud computing center. The trusted virtualization platform limits administrator access to the data and state of the virtual machines running thereon, reports any changes made thereto, and requires keys provided by the customer or a trusted third party of the customer to perform management operations on the virtual machines. By requiring cloud computing centers to use such trusted virtualization platforms, customers uploading their virtual machines into the cloud computing center can be assured that cloud administrators will not be able to access or tamper with their private data. Furthermore, customers can directly audit all important state or configuration changes for their virtual machines as the trusted virtualization platform can be configured to report all such changes according to a security policy set by the customer.

A method of securing virtual machines in a multi-tenant data center including a plurality of server computers and persistent data stores, according to an embodiment of the present invention, includes the steps of configuring a server computer with a trusted platform module, installing a trusted software stack on the server computer, measuring a static property of the software stack and storing the measurement, transmitting the measurement to an external entity and, in response thereto, receiving from the external entity a key for running a virtual machine on top of the trusted software stack, and running the virtual machine on top of the trusted software stack using the key.

A method of securing virtual machines in a multi-tenant data center including a plurality of server computers and persistent data stores, according to another embodiment of the present invention, includes the steps of receiving a request for a key to run a virtual machine on a server computer configured with a trusted platform module, the key request including a customer ID associated with the virtual machine, requesting the server computer for static property measurements of a software stack on top which the virtual machine will be run and, in response thereto, receiving the static property measurements, and confirming from the static property measurements that the software stack is a trusted software stack and, after said confirming, transmitting to the server computer the key to run the virtual machine on the server computer. In another embodiment, the method further comprises the steps of receiving a public key of the trusted platform module from the server computer, and searching for the public key in an inventory associated with the multi-tenant data center, wherein the key to run the virtual machine on the server computer is transmitted to the server computer after it is confirmed that the public key has been found in the inventory associated with the multi-tenant data center.

A multi-tenant data center that provides security to customer data, according to an embodiment of the present invention, includes a plurality of server computers, each of which is configured with a trusted platform module and a trusted virtualization platform having one or more software layers on top of which a customer application is to be executed, and a persistent storage system coupled to the server computers, in which files for launching the customer application, such as the customer's virtual machine, are stored, the files including an encrypted portion and a plain text portion that identifies the customer and a network location associated with the customer. In one embodiment, the trusted virtualization platform is programmed to perform an audit and report any changes to the trusted virtualization platform to the network location associated with the customer. Once it has been confirmed that no changes have been made to the trusted virtualization platform, the trusted virtualization platform can obtain keys from the network location associated with the customer to decrypt the encrypted portion of the files for launching the customer application, such as the customer's virtual machine.

Further embodiments of the present invention include, without limitation, a non-transitory computer-readable storage medium that includes instructions that enable a processing unit to implement one or more aspects of the above methods.

DETAILED DESCRIPTION

Figure 1:
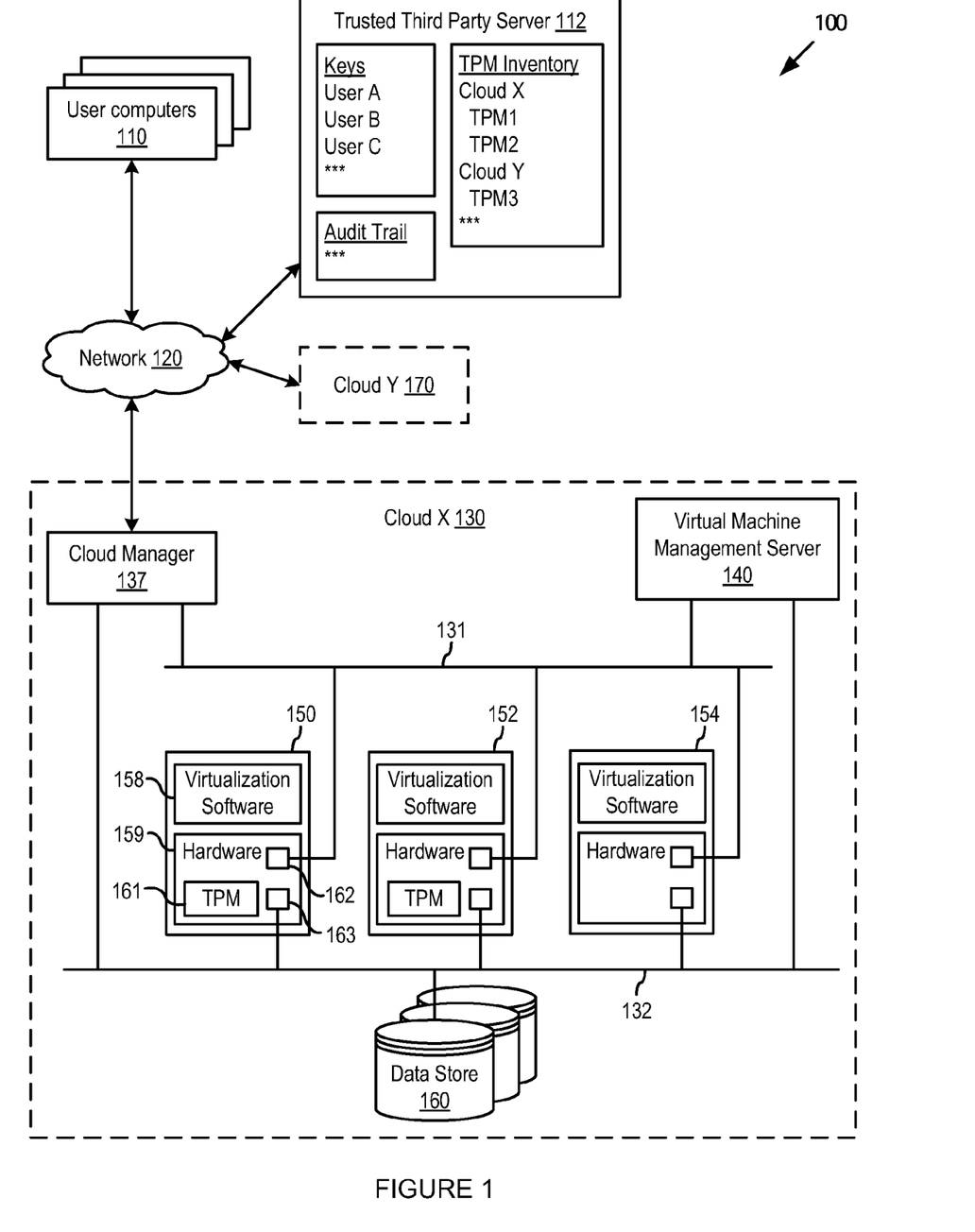
FIG. 1 illustrates elements of a computer system in which one or more embodiments of the present invention may be practiced.

FIG. 1 illustrates elements of a computer system 100 in which one or more embodiments of the present invention may be practiced. Computer system 100 includes one or more cloud computing centers (cloud X 130 and cloud Y 170), computing devices of users or customers of the cloud computing centers (user computers 110), and a server computer of a trusted third party (trusted third party server 112) to whom users may have delegated certain responsibilities relating to the computing services provided by the cloud computing centers.

Communication between the computing entities illustrated in FIG. 1 is carried out over a network 120, which may be the Internet.

The cloud computing centers provide shared hardware resources, software, and information on demand to their customers over a computer network, such as the Internet. In the example illustrated in FIG. 1, cloud X 130 is providing this service to user A over network 120 in accordance with certain security polices set by user A. The security policies may be enforced directly by user A or by a trusted third party of user A, e.g., by way of trusted third party server 112. Trusted third party server 112 maintains keys for various users, including the keys of user A, that are used in enforcing the security policies. Trusted third party server 112 also maintains an inventory of trusted platform modules (TPMs) that are installed in different cloud computing centers in the form of certificates associated with the TPMs, each certificate containing the public portion of endorsement key pair (EK) of a corresponding TPM, and an audit trail for each of the users that it is serving. The inventory and the audit trails are used to perform security checks that will be further described below.

Cloud X 130 implements virtual machines (not shown) to serve its customers and includes a cloud manager 137, a virtual machine management server 140, a plurality of physical computers (e.g., physical computers 150, 152, 154), and a shared data store 160. Cloud manager 137 is a computing device that is configured to manage the cloud computing resources provided to the users and includes an interface to network 120. Depending on user requests or prompted by an administrator, cloud manager 137 may issue certain operations to be carried out by virtual machine management server 140, such as virtual machine power on and off. Virtual machine management server 140 is a computing device that is configured to perform virtual machine management operations such as virtual machine power on and off, migrating virtual machines between physical computers, migrating persistent state of virtual machines between data stores, creating/reverting/destroying virtual machine snapshots, adding/removing devices from virtual machines, allocating processing and memory resources to virtual machines, and others. These virtual machine management operations may be initiated by cloud manager 137, a load balancing or scheduling module, or by an administrator.

The physical computers each include virtualization software 158 and hardware 159, and are coupled to a shared persistent storage system that includes one or more shared data stores 160. Virtualization software 158 is installed on top of hardware 159 and supports multiple virtual machine execution spaces within each of which a virtual machine process may be executed to instantiate corresponding virtual machines. For each of the instantiated virtual machines, virtualization software 158 manages a corresponding virtual hardware platform that includes emulated hardware devices such as a virtual processor, guest physical memory, virtual network interface card, virtual disk, and others.

Hardware 159 includes a TPM 161 and standard components of a computer system, such as a processor (not shown), memory (not shown), a network interface card (NIC) 162 connected to data network 131, and a disk interface 163 connected to storage network 132. Persistent storage for each of the physical computers 150, 152, 154 is provided by shared data store 160.

For purposes of illustration, in the example shown in FIG. 1, hardware of physical computer 150 and physical computer 152 includes a TPM, but hardware of physical computer 154 does not. The TPM enables a trusted virtualization platform (TVP) to be implemented in the physical computers. The TVP for physical computer 150 is shown in further detail in FIG. 2.

Figure 2:
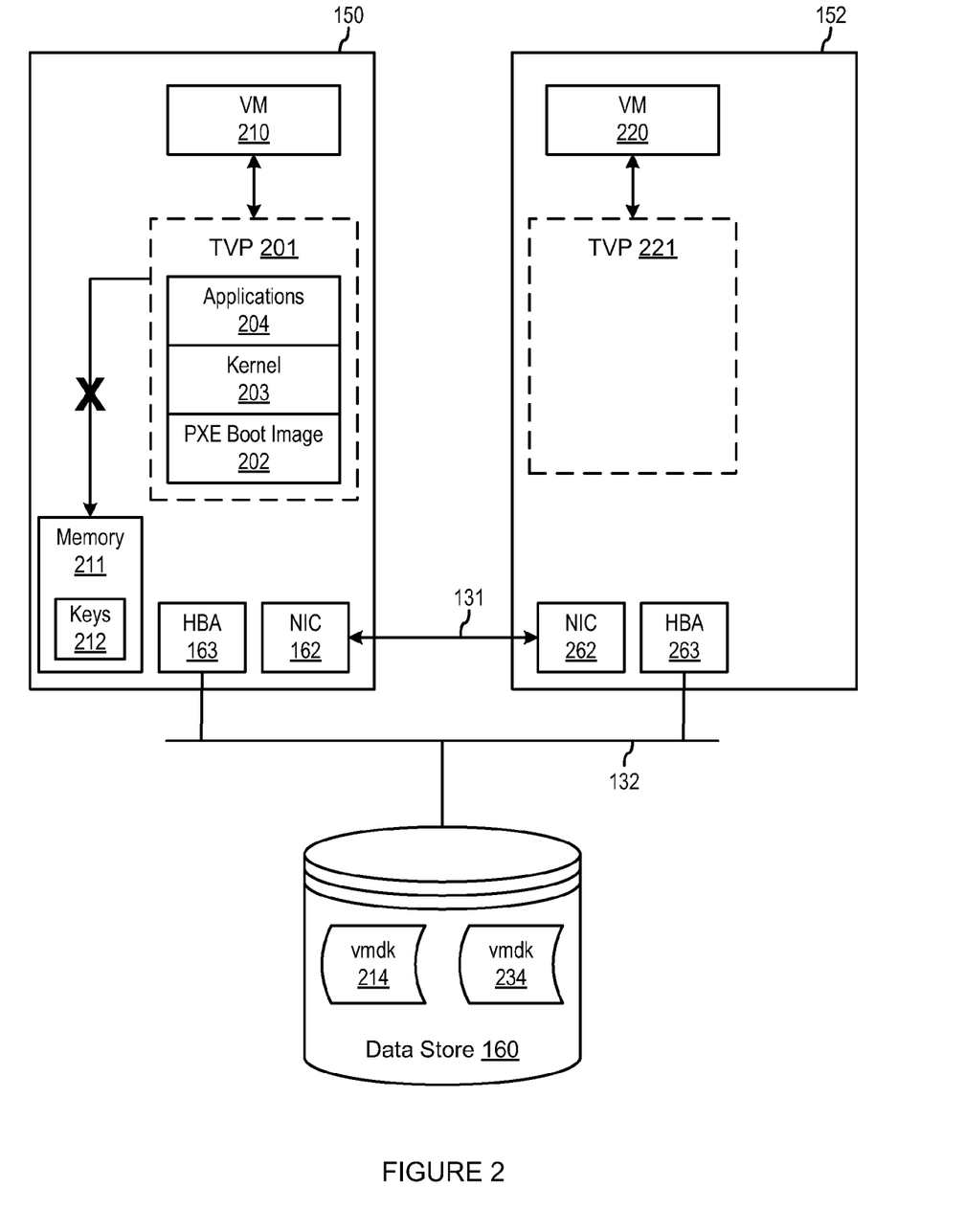
FIG. 2 illustrates a trusted virtualization platform (TVP) for a virtual machine according to one or more embodiments of the present invention.

Referring to FIG. 2, TVP 201 of physical computer 150 includes a pre-execution environment (PXE) boot image 202, virtual machine kernel 203, and applications 204 (e.g., different applications for supporting the execution of VM 210). TVP 201 is specially configured to lock out the root (admin) user from making any changes thereto. For example, SSH access is disabled. In addition:

(1) In-place executable upgrades are not allowed.

(2) No root program can be installed to inspect guest physical memory of the virtual machine.

(3) API calls that allow administrator to load modules or manipulate virtual machine definition files are not provided.

(4) All administrator operations performed on the virtual machine will trigger a report to a trusted third party of the user so that they can be monitored.

In addition to the above properties, TVP 201 provides protection for storage and network communications. Storage protection is provided by encrypting a virtual machine's virtual disk. In FIG. 2, the virtual disk for VM 210 is represented as vmdk 214, and the virtual disk for VM 220 is represented as vmdk 234. Each virtual disk comprises one or more data files (e.g., files with a .vmdk extension) that each contain a disk image (or portion thereof) for each VM's virtual disk. The virtual disk image files stored in data store 160 in encrypted form and accessed through respective one of host bus adapters (HBAs) 163, 263 over network 132. An encryption key will need to be obtained from the customer or the customer's trusted third party before the virtual machines can operate (perform input/output operations) on the data stored in the virtual disks. It should be recognized that the decrypted data are stored in memory and made available to the virtual machines but will remain inaccessible by the administrator. In addition, keys 212 provided to TVP 201 by the customer or the customer's trusted third party are stored in memory 211 and will be inaccessible by the administrator. The integrity of the data stored in the virtual disks is also monitored using a keyed hash, also known as MAC (Message Authentication Code).

Protection for network communications between VMs that are owned by the same customer is provided by requiring all such communications to be encrypted. The encryption key is obtained from the customer or the customer's trusted third party. A virtual machine that runs on a TVP, e.g., VM 220 running on TVP 221, will be able to engage in communication with VM 210 by obtaining the encryption key from the customer or the customer's trusted third party and exchanging encrypted messages with VM 210 through NIC 262 over network 131. On the other hand, network communication between VM 210 or VM 220 and a virtual machine that is not running on a TVP, e.g., a virtual machine running in physical computer 154, or a virtual machine of a different customer, will not undergo such encryption. In one embodiment, the encryption key used to secure the communication between VMs that are owned by the same customer is the same for all applications or operations of that customer. In another embodiment, the encryption key used to secure the communication between VMs that are owned by the same customer is different for different applications or operations of that customer.

In further embodiments, depending on the security requirements, TVP 201 may need to disable/restrict or modify security services which run as appliances. In addition, keys provided to TVP 201 may be configured with a lease period. In one embodiment, the lease period is defined in the customer's policy and keys configured with a lease period is automatically purged from memory when the lease period expires.

Figure 3:
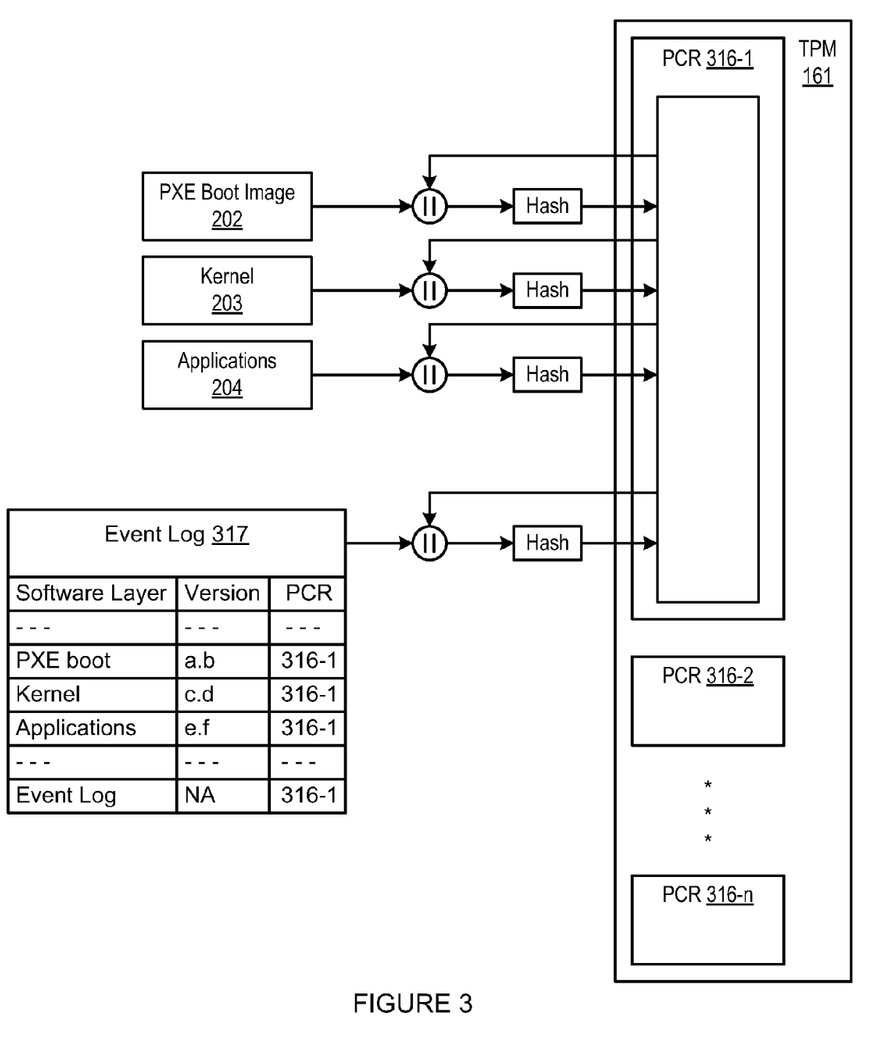
FIG. 3 is a conceptual diagram that illustrates how static properties of the TVP are measured.

FIG. 3 is a conceptual diagram that illustrates how the TPM is used to measure the static properties of the TVP. The static property measurements of the TVP ensure that the TVP has not been modified from the "trusted" version in any way. The static property measurements are stored in one of the PCRs (Platform Configuration Registers) of the TPM, e.g., PCR 316-1. In FIG. 3, TPM 161 is shown to have N PCRs. Each time a software layer is added to the TVP, a checksum is computed for that software layer and "extended" into a PCR. The "extend" operation concatenates the computed checksum with a hash value that has been previously computed and stored in the PCR, and generates a new hash of the concatenated value. The newly generated hash value is stored back in the same PCR. As a final step, which is an optional step, event log 317 is "extended" into the PCR. The entries of event log 317, which is maintained in memory, identify software layers, their version numbers, and corresponding PCR, in the order they were added to the TVP. The last entry of event log 317 is for the event log and identifies the PCR corresponding to the event log. A modification of the TVP from its "trusted" version would be detected when any of the values stored in the PCR do not match an expected value. In alternative embodiments, the newly generated hash values may be stored in different PCRs and event log 3171 indicates the correspondence between the static property measurements and the PCRs.

Figure 4:
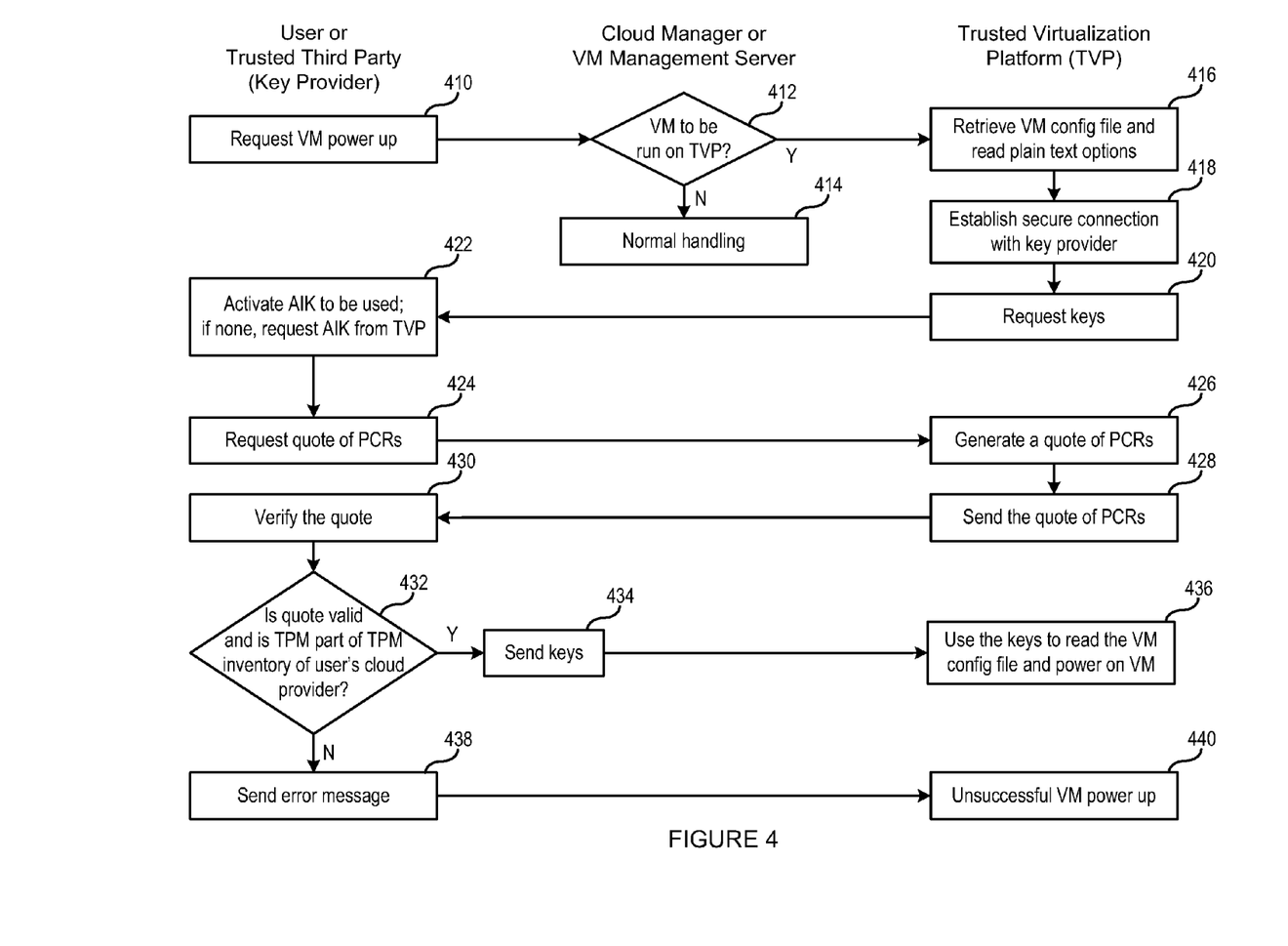
FIG. 4 is a flow diagram that illustrates the method of powering on a virtual machine according to one or more embodiments of the present invention.

FIG. 4 is a flow diagram that illustrates the method of powering on a virtual machine according to one or more embodiments of the present invention. At step 410, the user sends a request to power on his or her virtual machine to the cloud manager, who passes on the request to the virtual machine management server. If it is determined at step 412 that the virtual machine is to be run on a TVP, the method proceeds to step 416. On the other hand, if a TVP is not required, the virtual machine is powered on normally at step 414.

At step 416, the TVP retrieves a VM configuration file corresponding to the requested virtual machine from storage. The VM configuration file provides encrypted configuration information and includes a plain text portion including the customer ID and the domain name of the customer (or "user") or the customer's trusted third party (hereinafter referred to as "key provider"). At step 418, the TVP establishes a secure connection (e.g., SSL-encrypted session) with the key provider. This step includes first obtaining the SSL certificate for the key provider and then verifying that the SSL certificate has been signed by a proper certificate authority. At step 420, the TVP requests the key provider for one or more keys needed for powering up the virtual machine. The keys will allow the TVP to decrypt the remainder of the VM configuration file and associated data files, e.g., the virtual disk of the virtual machine. As part of this request, it also sends the customer ID. Upon receiving the request at step 422, the key provider activates the AIK (Attestation Identification Key) to be used for attestation. If there is no AIK, the key provider requests one from the TVP, in response to which the TPM of the TVP generates the public and private portions of the AIK.

The TVP then binds the public portion of the AIK to the public portion of the EK and sends the bound keys to the key provider. As part of the AIK activation step, the key provider retrieves the public portion of the AIK, and also checks its inventory to verify that the public portion of the EK that was bound to the public portion of the AIK is part of the inventory of the customer's cloud provider.

After activation of the AIK, at step 424, the key provider requests the TVP for a quote of the PCRs of the TPM. The key provider also generates a random nonce and transmits the random nonce with the request at step 424. The TVP receives the request for the quote of the PCRs and the random nonce, and at step 426 the TPM generates the quote of the PCRs and encrypts the quote of the PCRs along with the random nonce using the private portion of the AIK. The quote of the PCRs and the random nonce are transmitted to the key provider at step 428. It should be recognized that the exchange of the random nonce protects against replay attacks.

At step 430, the key provider carries out the step of verifying the quote of the PCRs. This step includes decrypting the data received from the TVP using the public portion of the AIK, comparing the PCR values included in the quote of the PCRs against expected PCR values, and comparing the decrypted random nonce with the random nonce that was sent at step 424. If it is determined at step 432 that all of these checks have passed, the key provider transmits the keys at step 434, and the TVP uses the keys to read the VM configuration file and power on the virtual machine at step 436. On the other hand, if any of the checks failed, the key provider transmits an error message at step 438 and the virtual machine power on attempted by the TVP is unsuccessful (step 440).

Figure 5:
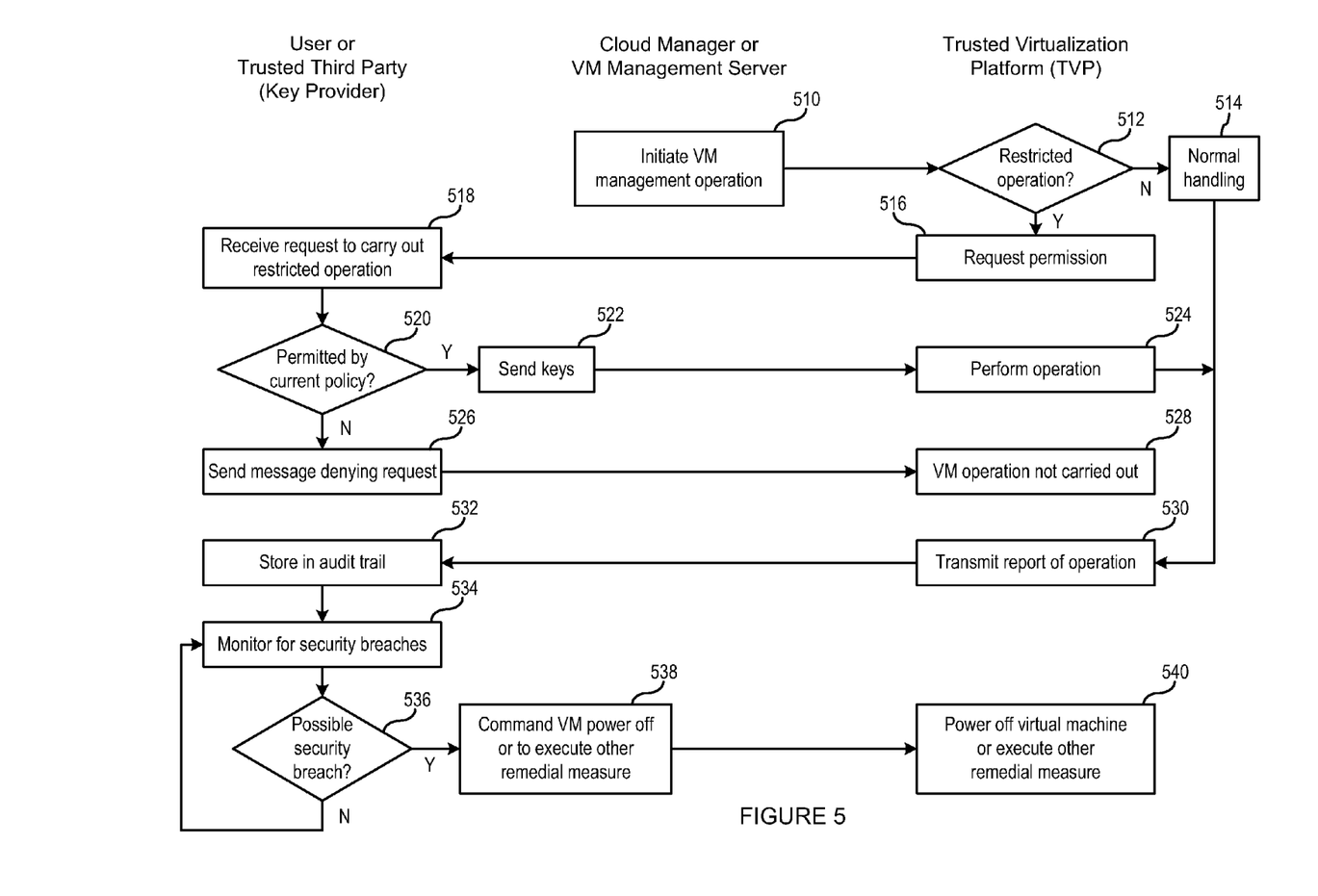
FIG. 5 is a flow diagram that illustrates the method of handling management operations to be performed on a virtual machine running on a TVP, according to one or more embodiments of the present invention.

Even after the virtual machine has been powered on, the TVP only permits certain management operations to be performed on the virtual machine. FIG. 5 is a flow diagram that illustrates the method of handling management operations to be performed on a virtual machine running on a TVP, according to one or more embodiments of the present invention. The management operations include virtual machine power off, migrating virtual machines between physical computers, creating/reverting/destroying virtual machine snapshots, adding/removing devices from virtual machines, and allocating processing and memory resources to virtual machines.

At step 510, the cloud manager, the virtual machine management server, or the administrator initiates a management operation on a virtual machine. Certain management operations do not compromise the security of a virtual machine and so those are handled in the normal way at step 514. If it is determined at step 512 that the management operation initiated at step 510 has security implications and is therefore a restricted operation, then the TVP requests the key provider for permission to carry out the management operation at step 516. The key provider receives this request at step 518 and determines at step 520 whether or not the requested management operation is permitted by the customer's policy. If it is permitted, keys for performing the requested management operation are sent to the TVP at step 522, and the TVP performs the management operation on the virtual machine at step 528. If it is not permitted, a message indicating denial of the request is sent to the TVP at step 522.

Step 530 is implemented in the TVP so that the key provider can audit the trail of management operations performed on the virtual machine. In one embodiment, after step 514 and step 524 are carried out, the management operation that was performed on the virtual machine is reported to the key provider at step 530. In another embodiment, the types of management operations executed in step 514 or step 524 that are reported are defined in the customer's security policy. At step 532, the key provider stores the reported operation and monitors it at step 534 for any operations that might compromise the security of the virtual machine. If a possible security breach is detected at step 536, a request to power off the virtual machine or to perform some other remediation action as may be preconfigured by the customer or according to customer's policy is sent at step 538. Examples may include an alert being sent to the customer, or migrating the VM to the customer's private cloud, i.e., the customer's own data center. At step 540, the virtual machine is powered off or some other remedial action is taken as may be preconfigured by the customer or according to customer's policy If a possible security breach is not detected at step 536, the flow returns to step 534, and the audit trail is continued to be monitored.

As one example, if a load balancing module running inside virtual machine management server 140 is recommending a migration of a virtual machine running in physical computer 150 to a target physical computer, the method described in FIG. 5 would be carried out to obtain keys for this management operation. If the target physical computer is physical computer 154, the request will be denied because physical computer 154 is not running a TVP. On the other hand, if the target physical computer is physical computer 152, the request will be granted after verifying the quote of the PCRs of the TPM in physical computer 152 and after confirming that TPM in physical computer 152 is found in the inventory of TPMs inside cloud X 130. The keys that are transmitted to the TVP includes a key for securely transmitting memory state of the running virtual machine over the network from physical computer 150 to physical computer 152, a key for decrypting the VM configuration file, and a key for decrypting the VM's virtual disk. In an alternative embodiment, after the memory state of the running virtual machine has been migrated, the TVP in physical computer 152 contacts the key provider for keys to power on the virtual machine in physical computer 152 according to the method described in conjunction with FIG. 4.

In the example method of handling management operations to be performed on a virtual machine running on a TVP, illustrated in FIG. 5, the audit trail message is sent after a restricted management operation is carried out. In other embodiments of the present invention, the audit trail message is sent after it has been determined that the management operation is a restricted operation in step 512 and before such management operation is actually carried out, e.g., between steps 512 and 516.

In order to allow administrators or support engineers to debug certain class of issues, a new shell mode may be included in the TVP. This new shell mode provides shell access to the physical computer and hypervisor running thereon, but only after the TVP scrubs all memory and storage that can potentially leak customer data. After the scrubbing, the TVP causes the TPM to extend a hash of the shell's binary code to be into the PCR where the hash of the TVP has been recorded so that the quote of the PCRs will reflect the fact that a support shell has been launched on the physical computer. From this point on, the virtual machine cannot be restarted on this physical machine without going through the reboot process. If more than one virtual machine is running on the TVP, the support shell will not be allowed if the policy of any one virtual machine does not allow it.

In another embodiment of the present invention, the trusted software stack is not a trusted virtualization platform, but a trusted platform on which a normal user application can be executed. In such embodiments, the trusted software stack would include an operating system kernel in place of the virtual machine kernel, and the files stored in data store 160 that are encrypted would include configuration files for the application and files created and modified by the application.

The embodiment of the present invention shown in FIG. 1 includes a TPM as a module for performing remote attestation, but it should be recognized that other embodiments of the present invention may provide the remote attestation functionality using different modules. Furthermore, in an alternative embodiment, the key provider, before sending a key for performing restricted management operations to any server, encrypts the key using a public key of the target server. The encrypted key can be decrypted only with a private key associated with the public key, i.e., the private key of the target server, so that if any other servers intercepted the encrypted key, it cannot be decrypted. Further, the encrypted key cannot be decrypted even by the target server using its private key, if the trusted platform on the target server has changed such that the current static properties of the trusted platform does not match the previously measured and recorded static properties of the trusted platform.

In a further embodiment of the present invention, which is an extension of the embodiments of the present invention employing a TPM as a module for performing remote attestation, one or more keys for performing restricted management operations on the VM are encrypted upon receipt by the server from the key provider, and the encrypted keys are transmitted back to the key provider. If the server needs one of the keys to perform a restricted management operation at a later time, the key provider, after performing the remote attestation on the server and confirming that the trusted platform on the server has not changed, transmits the encrypted key to the server. It should be recognized that the encryption of the keys for performing restricted management operations in this manner provides another layer of security for the keys.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of securing virtual machines in a multi-tenant data center including a plurality of server computers and persistent data stores, comprising:
    configuring a server computer with an attestation module;
    installing a software stack on the server computer;
    measuring, with the attestation module, a static property of the software stack and storing the measurement in the attestation module;
    receiving a request to start a virtual machine using the software stack on the server computer;
    in response to receiving the request to start the virtual machine, transmitting the measurement stored in the attestation module to an external entity and, in response to a verification that the measurement matches an expected value at the external entity, receiving from the external entity a key for running the virtual machine using the software stack;
    running the virtual machine on top of the software stack using the key;
    receiving a request to execute a management operation on the virtual machine; and
    creating an audit trail by sending the management operation to the external entity.

2. The method of claim 1, wherein the external entity is an owner of the virtual machine or a third party to whom the owner has delegated security monitoring responsibilities.

3. The method of claim 1, wherein the software stack does not permit selected management operations to be performed on the virtual machine without permission from the external entity.

4. The method of claim 3, further comprising:
    determining that the requested management operation is one of the selected management operations; and
    based on the determination that the requested management operation is one of the selected management operations, creating the audit trail by sending the management operation to the external entity;
    wherein the selected management operations include migration of the virtual machine to another server computer, creation of a snapshot of the virtual machine, and in-place upgrade of the virtual machine.

5. The method of claim 1, wherein the software stack prevents the virtual machine from communicating with an identified virtual machine running on another sever computer without an encryption key.

6. The method of claim 5, further comprising:
    transmitting a request for the encryption key to the external entity, the request including an identification of the virtual machine running on another sever computer.

7. The method of claim 1, wherein the software stack has multiple layers and a static property measurement is carried out incrementally each time a software layer is added.

8. The method of claim 7, wherein the attestation module is a trusted platform module (TPM) having multiple registers and each incremental static property measurement is recorded in one of the registers of the TPM.

9. The method of claim 1, further comprising:
    determining that the management operation is a restricted management operation; and
    sending a notification of the restricted management operation to the external entity before the restricted management operation is carried out and after the restricted management operation is carried out.

10. The method of claim 1, further comprising:
    determining that the management operation is a request to debug a certain class of issues;
    based on the determination that the management operation is a request to debug a certain class of issues, creating a shell mode of the virtual machine on the software stack, the shell mode providing shell access to the server computer and hypervisor running thereon.

11. The method of claim 10, wherein the shell mode is enabled to be created only after the software stack scrubs all memory and storage that can potentially leak user data.

12. The method of claim 11, further comprising:
    after the scrubbing, extending a hash of the shell's binary code into a Platform Configuration Registers (PCR) where the hash has been recorded to reflect that a shell has been launched on the server computer; and
    prohibiting the virtual machine from being restarted on the server computer without going through a reboot process.

13. A non-transitory machine readable storage medium for securing virtual machines in a multi-tenant data center including a plurality of server computers and persistent data stores, the machine readable storage medium having computer instructions encoded thereon causing a computer configured as a trusted virtualization platform to perform a method, the method comprising:
    receiving a request for a key to run a virtual machine on a server computer configured with an attestation module, the key request initiated by a request for a virtual machine received at the server computer, the key request including a customer ID associated with the virtual machine;
    in response to the key request, requesting the server computer for static property measurements of a software stack on top which the virtual machine will be run, the static property measurements stored in the attestation module on the server computer;
receiving the static property measurements stored in the attestation module from the server computer;
confirming from the static property measurements that the software stack is a trusted software stack by verifying that the static property measurements stored in the attestation module match an expected value and, after said confirming, transmitting to the server computer the key to run the virtual machine on the server computer;
receiving a request to execute a management operation on the virtual machine; and
creating an audit trail by storing the requested management operation.

14. The machine readable storage medium of 13, wherein the method further comprises:
receiving a public key of the attestation module from the server computer; and
searching for the public key in an inventory associated with the multi-tenant data center,
wherein the key to run the virtual machine on the server computer is transmitted to the server computer after it is confirmed that the public key has been found in the inventory of associated with the multi-tenant data center.

15. The machine readable storage medium of 13, wherein the method further comprises:
receiving a request to perform an operation on the virtual machine running on the server computer; and
examining a policy associated with the virtual machine and transmitting a key for performing the operation on the virtual machine if the policy permits the operation and transmitting a message denying the request if the policy does not permit the operation.

16. The machine readable storage medium of 13, wherein the method further comprises:
after the virtual machine is running on the server computer, transmitting a key for encrypting and decrypting data stored in a virtual disk of the virtual machine.

17. The machine readable storage medium of 13, wherein the method further comprises:
receiving a request to transmit a network packet to another virtual machine running in a different server computer;
confirming that the different server computer is running a trusted software stack and said another virtual machine is running on top of the trusted software stack; and
upon said confirming, transmitting to the server computer a key for encrypting the network packet to be transmitted to said another virtual machine.

18. The machine readable storage medium of 13, wherein the method further comprises:
receiving a public portion of an attestation identification key (AIK) from the server computer,
wherein the static property measurements are encrypted with a private portion of the AIK and decrypted using the public portion of the AIK.

19. The machine readable storage medium of 13, wherein the method further comprises:
transmitting a random nonce to the server computer; and
confirming that the static property measurements were actually transmitted by the server computer when the random nonce is also received from the server computer.

20. The machine readable storage medium of claim 13, wherein the method further comprises:
determining that the requested management operation is a security breach;
request a remediation action based on the security breach.

21. The machine readable storage medium of claim 20, wherein the remedial action is one or more of the following: a request to power off the virtual machine; sending an alert to the customer; and migrating the virtual machine to a private cloud associated with the customer.

22. A multi-tenant data center system comprising:
a plurality of server computers, each of which is configured with a trusted platform module (TPM) and a trusted virtualization platform having one or more software layers on top of which a virtual machine is to be executed; and
a persistent storage system coupled to the server computers, in which files for launching the virtual machine are stored, the files including an encrypted portion and a plain text portion that identifies a customer and a network location associated with the customer,
wherein the trusted virtualization platform is programmed to:
create an audit trail by reporting any changes to the trusted virtualization platform to the network location associated with the customer;
in response to receiving a request for a virtual machine, obtain one or more keys from the network location associated with the customer to decrypt the encrypted portion of the files for launching the customer application, the one or more keys obtained by transmitting one or more measurements stored in the TPM to the network location and receiving the one or more keys if the one or more measurements match expected values in the network location;
receiving a request to execute a management operation on the virtual machine; and
adding the requested management operation to the audit trail by sending the management operation to the network location associated with the customer.

23. The system of claim 22, wherein the one or more keys are stored in the memory of the virtual machine and are inaccessible by an administrator.

* * * * *